US008997180B2

(12) United States Patent
Cairns et al.

(10) Patent No.: US 8,997,180 B2
(45) Date of Patent: Mar. 31, 2015

(54) SYSTEM AND METHOD FOR EMBEDDING FIRST PARTY WIDGETS IN THIRD-PARTY APPLICATIONS

(71) Applicant: Google Inc., Mountain View, CA (US)

(72) Inventors: Brian Lewis Cairns, Boulder, CO (US); Victoria Hsiao-Tsung Chou Fritz, New York, NY (US); Eric Benson Schoeffler, Boulder, CO (US); Michael Jeffrey Procopio, Boulder, CO (US)

(73) Assignee: Google Inc., Mountain View, CA (US)

( * ) Notice: Subject to any disclaimer, the term of this patent is extended or adjusted under 35 U.S.C. 154(b) by 210 days.

(21) Appl. No.: 13/841,663

(22) Filed: Mar. 15, 2013

(65) Prior Publication Data

US 2013/0347070 A1 Dec. 26, 2013

Related U.S. Application Data

(60) Provisional application No. 61/664,588, filed on Jun. 26, 2012.

(51) Int. Cl.
- G06F 7/04 (2006.01)
- H04L 29/06 (2006.01)
- H04W 4/00 (2009.01)
- H04L 29/08 (2006.01)

(52) U.S. Cl.
CPC .............. H04L 63/08 (2013.01); H04L 63/126 (2013.01); H04W 4/003 (2013.01); H04L 67/00 (2013.01)
USPC .......................................................... 726/3

(58) Field of Classification Search
CPC ....... G06F 21/56; G06F 21/44; G06F 21/565; G06F 2221/2119; H04L 63/08
USPC .......................................................... 726/3
See application file for complete search history.

(56) References Cited

U.S. PATENT DOCUMENTS

| 7,565,332 B2 * | 7/2009 | Williams et al. ............... 705/500 |
| 8,799,383 B2 * | 8/2014 | Chen et al. .................... 709/206 |
| 2004/0268149 A1 * | 12/2004 | Aaron ............................ 713/201 |
| 2005/0049989 A1 * | 3/2005 | Kaminsky et al. .............. 706/47 |

(Continued)

FOREIGN PATENT DOCUMENTS

WO WO 2009/120595 A2 10/2009

OTHER PUBLICATIONS

International Search Report dated Oct. 7, 2013 for PCTUS2013/047110 filed Jun. 21, 2013.

(Continued)

*Primary Examiner* — Dede Zecher
*Assistant Examiner* — Abdullah Almamun
(74) *Attorney, Agent, or Firm* — Ropes & Gray LLP

(57) ABSTRACT

Methods and systems provide embeddable user interface widgets to third-party applications so that the widgets can be securely embedded in, and securely used from within, the third-party applications. An embeddable widget may be authorized to access a first-party cloud storage system from a third-party application based on the cloud storage system authenticating a request received from the widget. The authentication may be based on an application identifier, an origin identifier, and/or one or more document identifiers received from the third-party application through the embedded widget. The disclosed methods and systems may significantly mitigate security concerns caused by embedding software in third-party sites, such as clickjacking.

20 Claims, 10 Drawing Sheets

(56) References Cited

U.S. PATENT DOCUMENTS

| | | |
|---|---|---|
| 2009/0182919 A1* | 7/2009 | Chang et al. ................. 710/106 |
| 2010/0242121 A1 | 9/2010 | Johnson et al. |
| 2011/0047449 A1 | 2/2011 | Polakam et al. |
| 2011/0085667 A1* | 4/2011 | Berrios et al. ................ 380/282 |
| 2011/0185406 A1 | 7/2011 | Hirson et al. |
| 2011/0307389 A1* | 12/2011 | Francia et al. ................ 705/67 |
| 2013/0073280 A1* | 3/2013 | O'Neil et al. .................... 704/9 |

OTHER PUBLICATIONS

Mayer et al., "Third-Party Web Tracking: Policy and Technology," 12 Proceedings of the 2012 IEEE Symposium on Security and Privacy, pp. 413-427, May 20-23, 2012.

* cited by examiner

SYSTEM AND METHOD FOR EMBEDDING FIRST PARTY WIDGETS IN THIRD-PARTY APPLICATIONS

CROSS REFERENCE TO RELATED APPLICATIONS

This application claims the benefit under 35 U.S.C. §119(e) of U.S. Provisional Application No. 61/664,588, filed Jun. 26, 2012, which is hereby incorporated by reference herein it its entirety.

BACKGROUND

Cloud storage systems provide users with the ability to store electronic documents and other files on a remote network rather than on a local computer. This allows users to access the remotely stored files from any device that is capable of connecting with the remote network, for example using a web browser over an Internet connection. Cloud storage systems may also provide users with a large amount of memory to store files so that users are not limited by the memory capacity of the devices that they own.

Users may access and manage files stored on the cloud storage system using tools provided by the cloud storage system. For example, the cloud storage system may provide a user interface for users to view, edit, and manage files stored on the system and to share files with other users. Cloud computing services may work in tandem with the cloud storage system to allow users to create and edit files and allow collaboration between users on the same file. These cloud storage system tools and services are typically controlled by the cloud storage system, and will be referred to herein as first-party systems or services.

Additionally, users may access and manage files stored on the cloud storage system (i.e., the first-party cloud storage system) using services and applications provided by third-party applications or services, such as third-party websites over the Internet. These third-party applications or services may allow users to create and modify files stored on the first-party cloud storage system. For example, a user may want to open and edit a drawing file stored on the first-party cloud storage system from a third-party drawing application. A user may also want to share the drawing file opened in the third-party drawing application with other users, through the first-party cloud storage system.

To facilitate access of users to first-party stored files from third-party applications, a first-party cloud storage system may want to provide third-party applications with an embeddable user interface, such as a widget, through which the user can access files stored on the cloud storage system. At the same time, embedding first-party widgets in third-party applications raises significant security concerns because the first-party system may not be able to control the way in which the third-party application is using or displaying the first-party widget. In one serious attack known as clickjacking, an attacker embeds a widget in a transparent, malicious third-party web frame and overlays the transparent frame over another non-transparent, seemingly legitimate frame. As a result, the user is tricked into clicking on the malicious transparent frame while believing she is clicking on the legitimate frame. This attack may have serious, unintended consequences, such as the user unintentionally making public a confidential file or unintentionally editing or deleting a file.

SUMMARY

The systems and methods described herein provide a way for first-party user interface components, or widgets, to be securely embedded in third-party applications and to be securely used in the context of these third-party applications.

One aspect described herein discloses a method for embedding a widget provided by a first-party system in a third-party application. The third-party application is provided with an embeddable first-party widget for embedding in a third-party web page, where the third-party web page is controlled by the third-party application. A message is received at the embedded first-party widget from the embedding third-party application, where the message includes an application identifier and an origin identifier. The application identifier and the origin identifier are received at a first-party server from the embedded first-party widget. The application identifier is authenticated at the first-party server, where said authenticating the application identifier includes determining whether the application identifier references a valid third-party application. The origin identifier is authenticated at the first-party server, where said authenticating the origin identifier includes determining whether the origin identifier is associated with the valid third-party application that is referenced by the authenticated application identifier. In response to said authenticating the application identifier and the origin identifier, the first-party widget is enabled to access the first-party system from the embedding third-party application.

Another aspect described herein discloses a system for embedding a widget provided by a first-party system in a third-party application. The system includes a first-party server configured for providing the third-party application with an embeddable first-party widget for embedding in a third-party web page, where the third-party web page is controlled by the third-party application, the embedded first-party widget is configured for receiving a message from the embedding third-party application, and the message includes an application identifier and an origin identifier. The first-party server is also configured for receiving at the first-party server from the embedded first-party widget the application identifier and the origin identifier, authenticating the application identifier at the first-party server, where said authenticating the application identifier includes determining whether the application identifier references a valid third-party application. The first-party server is also configured for authenticating the origin identifier at the first-party server, where said authenticating the origin identifier includes determining whether the origin identifier is associated with the valid third-party application that is referenced by the authenticated application identifier, and in response to said authenticating the application identifier and the origin identifier, enabling the first-party widget to access the first-party system from the embedding third-party application.

BRIEF DESCRIPTION OF THE DRAWINGS

The methods and systems may be better understood from the following illustrative description with reference to the following drawings in which.

DETAILED DESCRIPTION

Figure 1:
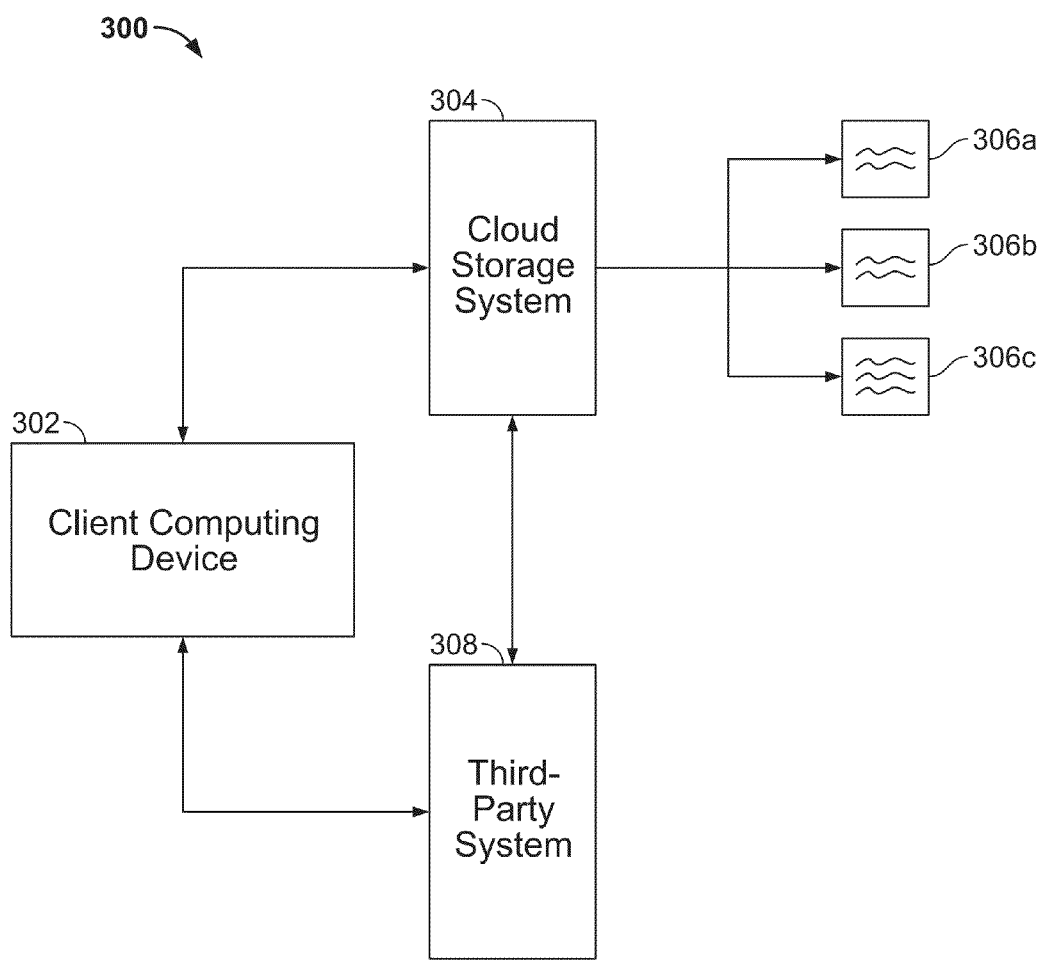
FIG. 1 shows a client computing device in communication with a third-party system capable of accessing files stored on a cloud storage system through an embeddable widget, in accordance with implementations as described herein.

To provide an overall understanding of the systems and methods described herein, certain illustrative embodiments will now be described, including systems and methods for securely embedding widgets in third-party applications and services. However, it will be understood that the systems and methods described herein may be adapted and modified as is appropriate for the application being addressed and that the systems and methods described herein may be employed in other suitable applications, and that such other additions and modifications will not depart from the scope thereof. In particular, a server or system as used in this description may be a single computing device or multiple computing devices working collectively and in which the storage of data and the execution of functions are spread out amongst the various computing devices.

Aspects of the systems and methods described herein provide ways for securely embedding first-party widgets in third-party systems. Many third-party systems available on the Internet provide users with various services and applications that the users may utilize to access, view, modify, share, and/or manage files. User may wish to store these files on a cloud storage system rather than on a local client computer. In order to enable access and management of files stored on the cloud storage system directly from the third-party system without the use of intermediary services, the cloud storage system may provide an embeddable user interface (UI), such as a widget, that third-party systems may embed on their websites. The embeddable UI gives a user the ability to access, view, modify, share, manage, and/or manipulate a file stored on the cloud storage system directly from the third-party system. In some embodiments, the embeddable UI is loaded on the user's client device when the user visits the third-party system website. In response to the user interacting with the UI from the third-party system website, the UI loaded on the client device sends a request to the cloud storage system, which includes an application identifier and an origin identifier for identifying the embedding third-party application. The cloud storage system authenticates the request and allows access to the file directly from the third-party system. In some embodiments, the embeddable UI is not displayed on the user's client device until the cloud storage system authenticates the request. The embeddable UI may include a file manager, a sharing interface (e.g., a document sharing settings configuration interface), a toolbar, a third-party application installation interface, a document selection screen, and/or any suitable UI component.

A cloud storage system may include one or more servers for providing cloud storage services to users on client devices. For example, a cloud storage system may include a number of data servers for storing a number of files for users of the cloud storage system. The cloud storage system may store a large number of such files in total for a number of users. Files that are stored in the cloud storage system may include word processing documents, spreadsheets, presentations, pictures, music, videos, and a variety of other file formats. A user may use a client device to log into the cloud storage system using a username and password or other login mechanism and access data files owned by the user.

Users may also access a number of third-party systems which provide services or applications for the user. Third-party services may include any commercial or publicly available service offered on the Internet, such as word processing applications, photo and video storing and sharing services, spreadsheet applications, graphic design services, presentation applications, database applications, gaming and entertainment services, music services, e-mail services, cloud storage services, banking and finance services, utility and billing services, and a variety of other categories. Third-party systems may allow users to view, create, store, copy, upload or download files stored on its system. A third-party system may include one or more computing devices, such as servers, to provide the third-party service. The third-party system may store any number of files for a number of users, such as word processing documents, spreadsheets, presentations, music, photos, videos, and the like.

A user may wish to access one or more files stored on a cloud storage system directly from a third-party application. FIG. 1 shows an example of how a client computing device may access a file stored on a cloud storage system through a third-party system. System 300 includes a client computing device 302 capable of communicating with a cloud storage system 304 and a third-party system 308. Client computing device 302 may be a desktop computer, laptop computer, tablet, smart phone, or any other type of electronic device that may connect with a remote network. The remote network connection may be a wired or wireless Internet connection, local area network (LAN), wide area network (WAN), Ethernet, or any other type of known network connection. Cloud storage system 304 may include one or more servers for providing cloud storage services to computing device 302. Cloud storage system 304 may include a number of data servers for storing a number of files, including files 306a, 306b, and 306c, for users of the cloud storage system.

System 300 also includes third-party system 308 which provides services or applications for the user. Cloud storage system 304 provides an embeddable UI that third-party system 308 may incorporate into its website. For example, third-party system 308 may download a software development kit from cloud storage system 304 that includes the embeddable UI. The embeddable UI provides users with the ability to access and/or modify a file stored on cloud storage system 304 directly from within third-party system 308. Javascript or any other known web programming language may be used to encode the embeddable UI. For example, the embeddable UI may include one or more buttons for opening files 306a, 306b, and/or 306c from third-party system 308. The embeddable UI may be made available to the user through a web page controlled by third-party system 308. For example, when a user visits the web page with the embeddable UI, a copy of the embeddable UI is loaded on the user's client computing device (e.g., through a web browser).

Figure 2:
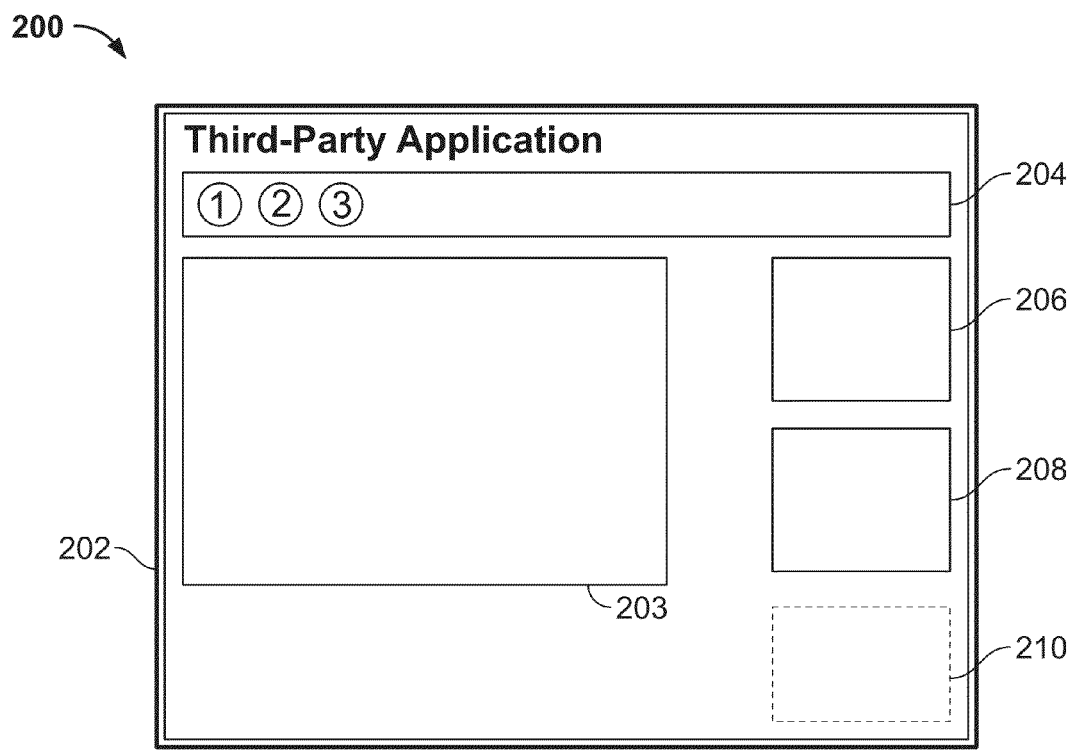
FIG. 2 shows a web page with embeddable user interface components in accordance with implementation as described herein.

An example of a third-party system web page that incorporates the first-party embeddable UI is shown in FIG. 2. Web page 200 includes a window 202, which may be a web browser window with multiple UI components, such as a document processing frame 203, a toolbar 204, and widgets 206, 208, and 210. As used herein, a widget refers to a user interface component that performs some particular function. In some implementations, a widget may include a graphical user interface control that can be overlaid on a web page displayed on the Internet. The widget may show information, such as in a window or text box, and/or include buttons or other controls that allow the user to access certain functionalities such as sharing or opening a file. In some implementations, a widget is a common looking user interface component having a portable portion of code that can be installed and executed within a separate web based page without compilation. Some components can include corresponding and/or additional user interfaces and can access a variety of resources such as local resources (e.g., a calendar, contact information, etc. on the user device) and/or remote/network resources (e.g., instant messaging, electronic mail, social networking updates, etc.).

Each of the UI components of web page 200 may be provided by the third-party application or by an external system, such as cloud storage system 304 from FIG. 1. In this example, UI components 203, 204, and 206 are provided by the third-party application, and UI components 208 and 210 are embeddable UI widgets provided by the cloud storage system. Each of the embeddable UI components of web page 200 may be loaded on the user's client device when the user visits the third-party system website. For example, embeddable UI component 208 may be displayed on web page 200 when the user visits the web page. In response to the user interacting with the embeddable UI, cloud storage system 308 may authenticate the request from web page 200. Alternatively, each of the embeddable UI components of web page 200 may be initially partially loaded on the user's client device such that the UI component is displayed only after the cloud storage system authenticates the request from web page 200. For example, embeddable UI component 210 is initially invisible and is displayed only after the cloud storage system has authenticated a request from the third-party web page 200. The layout of web page 200 is not limited to what is illustrated in FIG. 2 and may include any web page configuration. Details of these and other embodiments will be discussed in connection with the figures below.

Figure 3:
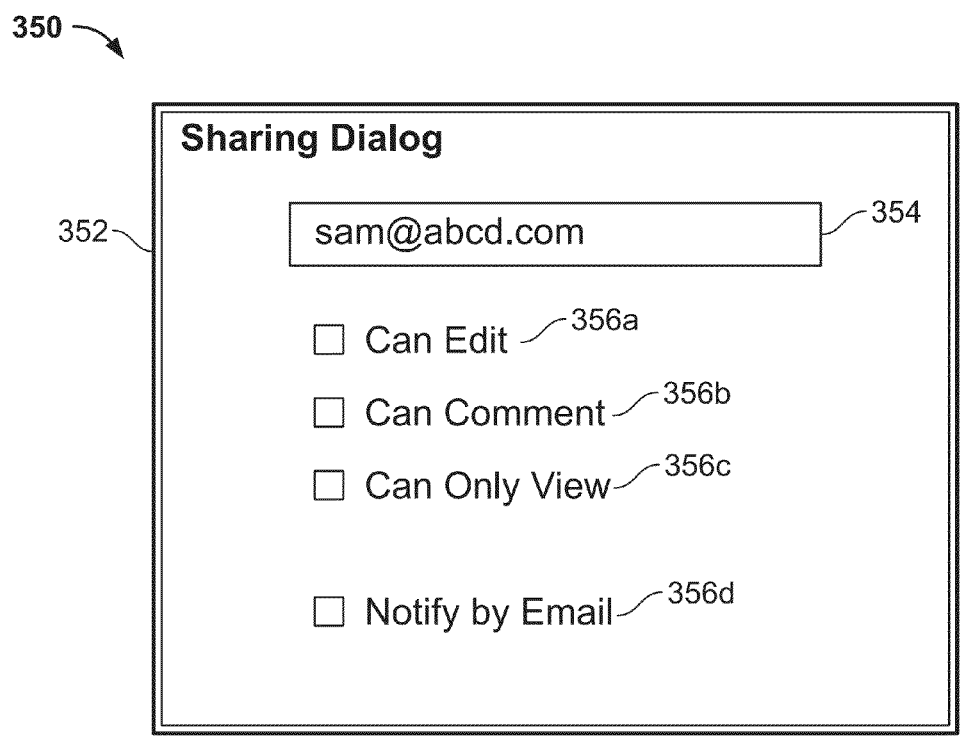
FIG. 3 shows a web page with an embeddable sharing user interface for sharing files stored on a cloud storage system from within a third-party system in accordance with an implementation as described herein.

In response to the user interacting with an embeddable UI component, for example by selecting widget 208 in web page 200, an embeddable UI is initiated that continues the process. Examples of an embeddable UI displayed within a third-party system are shown in FIG. 3, in the illustrative case where widget 208 is a sharing button, and in FIG. 4, in the illustrative case where widget 208 is a file selection button. These examples are shown for the purpose of illustration not limitation, and it should be understood that other implementations of the widget are within the scope of this disclosure. For example, widget 208 may have a toolbar, a sharing interface, a document selection user interface, a file manager user interface, a document editing user interface, a third-party application installation interface, and/or any suitable widget.

In the example of FIG. 3, the user is shown a web page 350 within the third-party application. The web page 350 includes an embeddable UI window 352 that is provided by the cloud storage system and is implemented as a sharing dialog. This embeddable UI window 352 may include a pop-up window frame that appears when a user chooses to share a file stored on the cloud storage system directly from the third-party application. Alternatively, embeddable UI window 352 may be an in-frame window that appears on top of web page 200, or may be displayed according to any other suitable layout. As illustrated in FIG. 3, embeddable UI window 350 may display an input field 354 for the user to specify another user with whom to share a file stored on the cloud storage system from within the third-party application. Embeddable UI window 352 may also include options such as sharing permission settings 356a, 356b, and 356c, sharing notification settings 356d, and/or any other sharing dialog option that may be set by the user from within the third-party application. The layout of embeddable UI window 352 is not limited to what is illustrated in FIG. 3 and may include any web page configuration.

Figure 4:
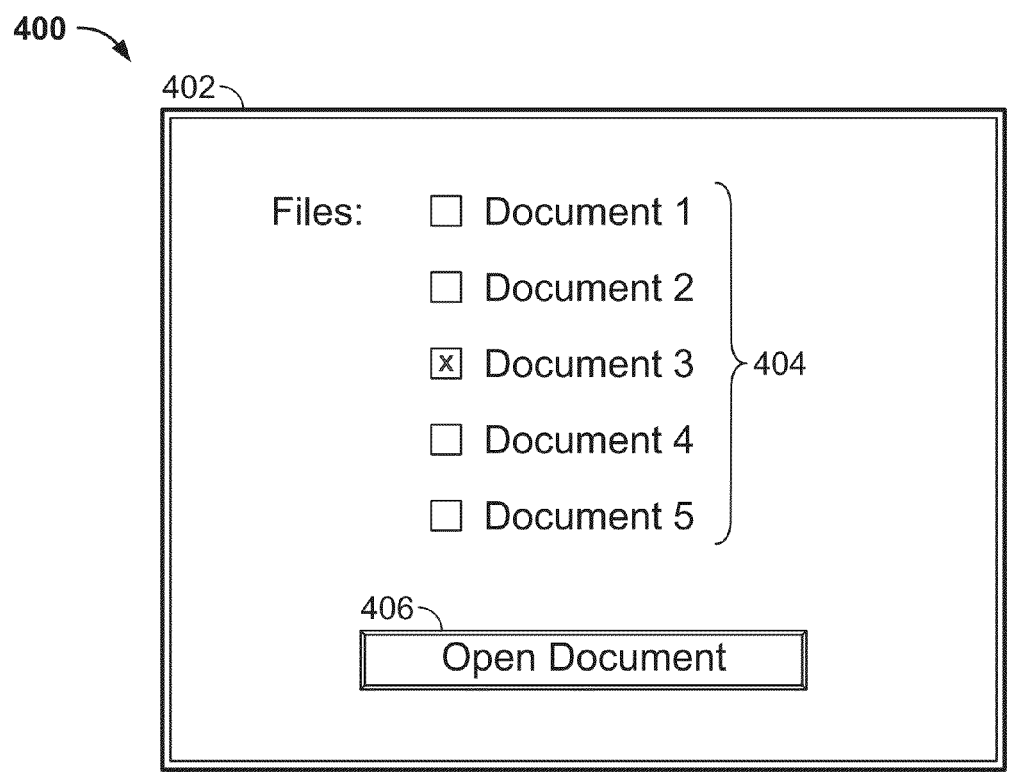
FIG. 4 shows a web page with an embeddable file selection user interface for opening files stored on a cloud storage system from within a third-party system in accordance with an implementation as described herein.

In the example of FIG. 4, the user is shown a web page 400 within the third-party application. The web page 400 includes an embeddable UI window 402 that is provided by the cloud storage system and is implemented as a file selection interface. The file selection interface may appear in response to a user choosing to open a file stored on the cloud storage system directly from the third-party application, or in response to the user choosing to insert a file stored on the cloud storage system from the third-party application, directly in another file currently open in the third-party application. This embeddable UI window 352 may be a pop-up window frame. Alternatively, embeddable UI window 402 may be an in-frame window that appears on top of web page 200, or may be displayed according to any other suitable layout. As illustrated in FIG. 4, embeddable UI window 402 may display a list of files 404 from which the user can select one or more files for accessing from within the third-party application. Once the user has selected the one or more files, the user may click button 406 for opening the one or more files for viewing or inserting in the context of the third-party application. The layout of embeddable UI window 402 is not limited to what is illustrated in FIG. 4 and may include any other web page configuration and functionality, such as drag-and-drop and search.

Figure 5:
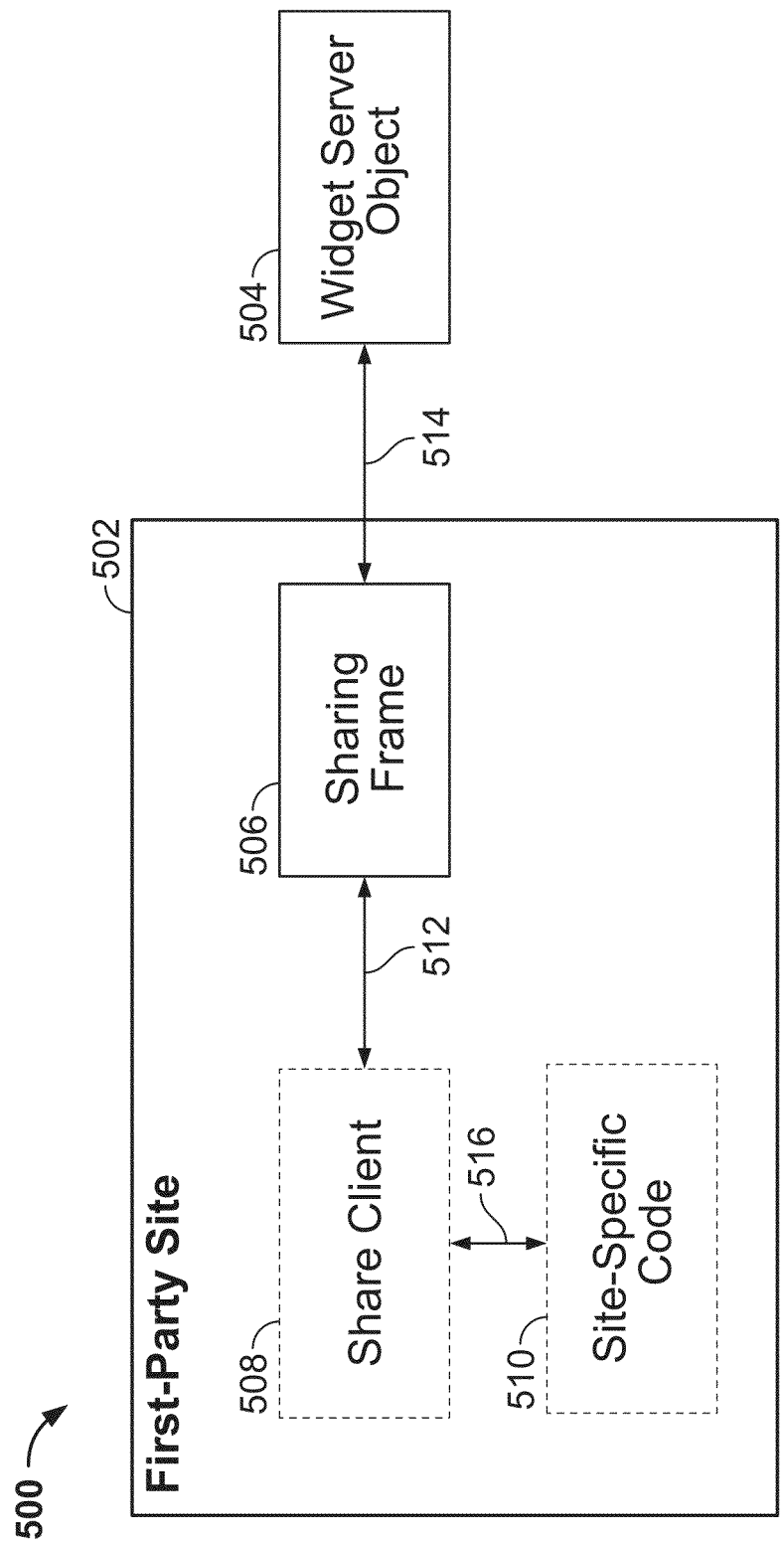
FIG. 5 is a diagram of a system where the embeddable user interface is embedded in a first-party site in accordance with an implementation as described herein.
Figure 6:
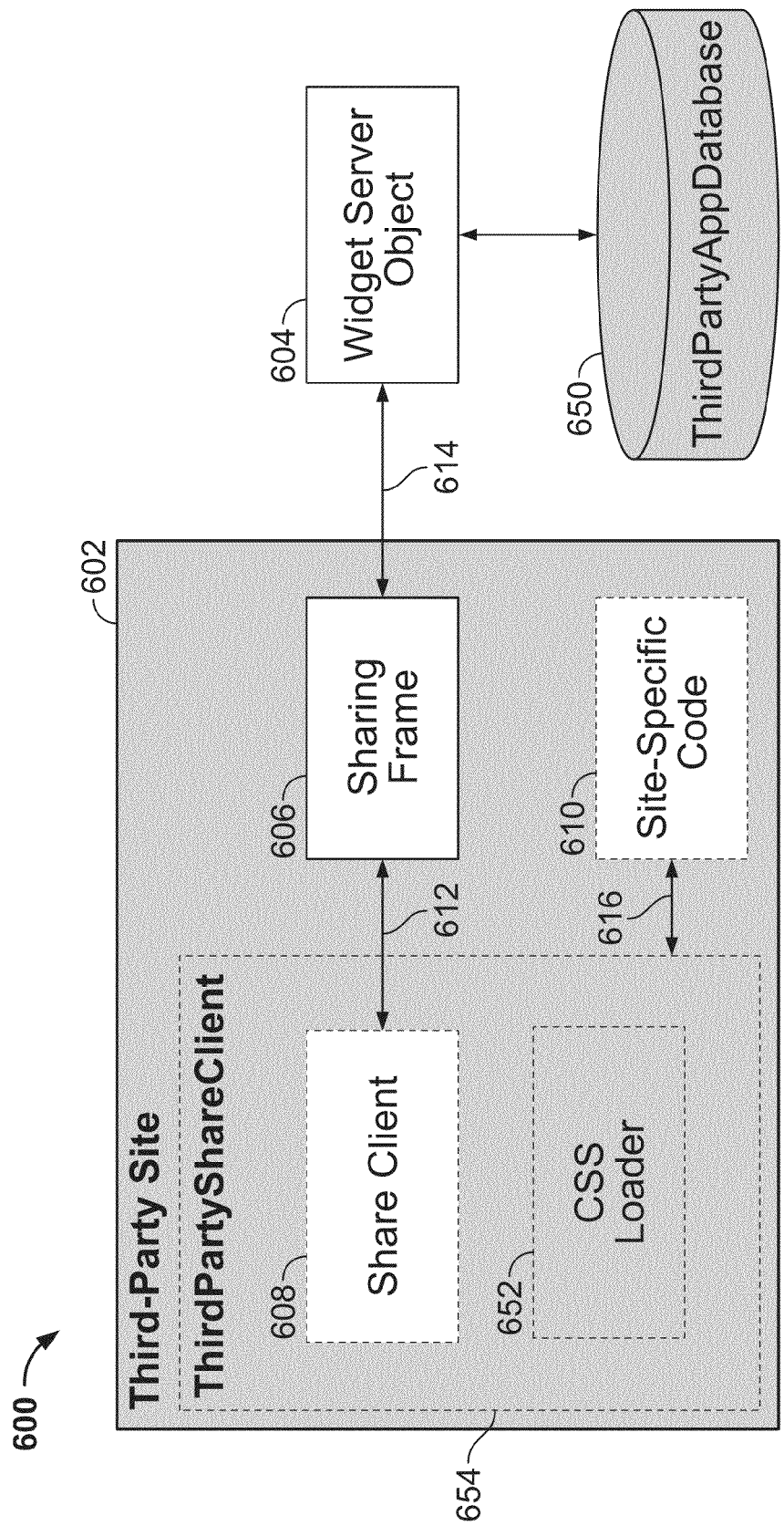
FIG. 6 is a diagram of a system where the embeddable user interface is embedded in a third-party site in accordance with an implementation as described herein.

FIGS. 5 and 6 are architecture diagrams that may be used to implement systems and methods disclosed herein. In these diagrams, solid borders are used to represent security boundaries. Although the embeddable UI in FIGS. 5 and 6 is implemented as a sharing widget, such as the embeddable sharing dialog illustrated in FIG. 3, this is merely illustrative, and the described architecture diagrams apply to widgets other than the document sharing settings configuration interface without departing from the scope of this disclosure. For example, the described architectures may be used to implement a third-party application installation interface, in which an embeddable view is displayed to the user, showing the details of the third-party application and allowing the user, from the third-party web page, to install the third-party's application into the first-party system. The described architectures may be used to implement a document selection user interface, a file manager user interface, a document editing user interface, a toolbar, or any other suitable widget.

FIG. 5 is a diagram of a system where the embeddable UI is incorporated in a trustworthy site, e.g., a first-party controlled site 502, such as a site run or hosted by the cloud storage system. Because embedding widgets in a first-party site does not carry the same security risks as embedding the widgets in a third-party system, system 500 is relatively straightforward. In system 500, the embeddable UI includes a sharing frame 506 embedded in the first-party site 502. A share client 508 is instantiated in the embedding site 502. Share client 508 may be a portion of program code and/or library suitable for inclusion or reference by a third-party web page. The share client 508 may be interacted with through an exposed public wrapper API. Share client 508 interacts with site-specific code 510 through communication link 516 and with sharing frame 506 through function calls 512. The sharing frame 506 also communicates with widget server object 504. Widget server object 504 may be a standalone first-party server for handling requests from widgets such as sharing frame 506; it may be a component of another server such as a first-party server that is part of the cloud storage system, or any other suitable component. In some implementations, widget server object 504 may be a Request Action object that listens for a request from widgets such as sharing frame 506, in response to which the Request Action object may send back a response. Sharing frame 506 and widget server object 504 may communicate using any suitable protocol, such as HTTP or XMLHttpRequest (XHR).

FIG. 6 is a diagram of a system 600 where the embeddable UI is incorporated in a third-party site 602. Similarly to system 500 of FIG. 5, system 600 has a share client 608, a sharing frame 606, site-specific code 610, and a widget server object 604. The common elements may help ensure compatibility with first-party sites, so that the same structures are used to communicate with widgets embedded in different types of web pages. At the same time, because of security concerns, the design of FIG. 6 extends the design of FIG. 5 with additional components (shaded in gray in FIG. 6) and may also use different communication protocols. For example, these security concerns are motivated by the assumption that third-party system developers may be able to manipulate any code outside of the sharing frame 606 when displaying the sharing widget, and may be able to manipulate any client-side code when displaying the widget on their own device. Some of the differences are highlighted below.

First, share client 608 is provided through ThirdPartyShareClient 654, which is a wrapper API created to expose some first-party functionalities to third-party system developers. ThirdPartyShareClient 654 may also manipulate visibility and other style and display properties of the sharing interface. This can be done through sharing frame 606, which may control how the widget is displayed on the third-party site. Initially, sharing frame 606 may cause the widget to be loaded with no script, such that the widget is not displayed until the third-party application has been validated. For example, sharing frame 606 may include CSS resources that may cause the widget to be invisible by default. In some implementations, the first-party server provides a sharing widget library with a highly simplified API that exposes only the minimum functions for opening the sharing interface on the third-party site. This library may have a single object, the wrapper ThirdPartyShareClient, which protects the internal share client. Upon initialization, ThirdPartyShareClient will also load the required CSS resources, from the sharing frame 606 as well as from the CSS loader 652. CSS loader 652 may loads styles for the portions of the UI that are outside of the sharing frame, such as a sharing interface border and drop shadow. The CSS resources embedded in the sharing frame 606 may be configured such that the sharing interface is invisible by default, and is displayed only after the third-party application has been validated.

Second, share client 608 communicates with sharing frame 606 through messages 612. Messages 612 may be implemented to safely enable cross-origin communication between two windows or frames across domains, e.g., between the first-party widget and the third-party site. For example, messages 612 may be implemented according to the HTML5 window.postMessage specification. Third, sharing frame 606 communicates with widget server object 604 using protocol 614, which may be a different from protocol 514 implemented in system 500. In one implementation, communication layer 514 may be a cross-frame communication layer and communication layer 614 may be an HTTP communication layer. Using these communication layers (e.g., postMessage and HTTP protocols) may avoid the significant additional complexity and potential security issues that are present in older cross-frame messaging systems.

Fourth, in contrast to widget server object 504, widget server object 604 is configured for checking third-party application access. Widget server object 604 may for example verify sharing permissions and render the initial view of the sharing interface. In one implementation, the first-party cloud storage system may provide sharing libraries for a third-party developer to create a web frame and set its link destination to a URL that is handled by the widget server object, along with parameters about what is being shared and how to render the sharing UI. To perform these functions, the widget server object 604 may retrieve third-party application information from an authentication database, ThirdPartyAppDatabase 650. This database may contain one or more data structures for storing application identifiers as well as identifiers of user accounts that have installed or registered the application corresponding to the application identifier. ThirdPartyAppDatabase 650 may also store origin identifiers, such as URLs associated with third-party applications. ThirdPartyAppDatabase 650 may also store file and third-party mappings to record if a particular file has been granted access from the third-party application. In one configuration, ThirdPartyAppDatabase 650 has one or more structures for storing what third-party applications have been installed or registered by a given user account. ThirdPartyAppDatabase 650 may also have one or more structures for storing, for each file, a list of third-party applications or application identifiers that have been authorized to access the file. The widget server object may use these structures to check that an application identifier is valid and that a file's authorized application list includes the third-party application that is referenced by the application identifier. ThirdPartyAppDatabase 650 may have one or more structures for storing a list of authorized origins for a third-party application or application identifier. The authorized origin list may be generated based on one or more URLs of the third-party application, a canonicalization of such URLs, or any other suitable address mechanism.

One advantage of the disclosed systems and methods is to significantly reduce the risk of security attacks such as clickjacking. By restricting how third-party applications embed widgets and restricting what files the third-party applications can access or edit through the widget, the attack surface is reduced. For example, the access controls implemented in the methods and systems described herein interlock to prevent third-party applications from displaying a sharing interface on unauthorized sites or editing the permissions for files for which the third-party applications have not been authorized. Several measures prevent unauthorized embedding. First, if an application identifier is not specified, the widget properties (e.g., X-Frame-Options header settings) are configured to prevent the interface from being framed. Second, if the application identifier is invalid, or if the application does not allow the embedding origin, the widget server denies access to the embedded widget. This prevents attackers from using an invalid application ID or an origin that is not allowed for the application.

Third, if the application does not have access to the requested files, the widget server denies access to the embedded widget. This helps mitigate a user confusion attack where the attacker shows a sharing interface to the user for a file that is unrelated to the user's application. With this measure, the attacker can only use files that their application already has access to, limiting the benefits of an attack.

Fourth, if the embedding origin does not match the actual origin of the embedding frame, the sharing interface may be loaded (assuming the application identifier and document identifiers are acceptable); however, the body of the widget would still be hidden, and the widget API (e.g., ThirdParty-ShareClient 654 of FIG. 6) would not function because the origin parameter for messages received by the widget frame will not match the embedding origin. Because the API must be used to show the page contents or initiate sharing, this measure effectively prevents arbitrary third-party pages from embedding the sharing interface.

In some embodiments, the authorization process has multiple steps, divided between the client and the server. For example, the server may be given the capability of verifying that the origin, application identifier, and/or document identifier are acceptable, and the widget page may be given the ability to verify that the third-party-provided origin is the real origin of the third-party application.

Figure 7:
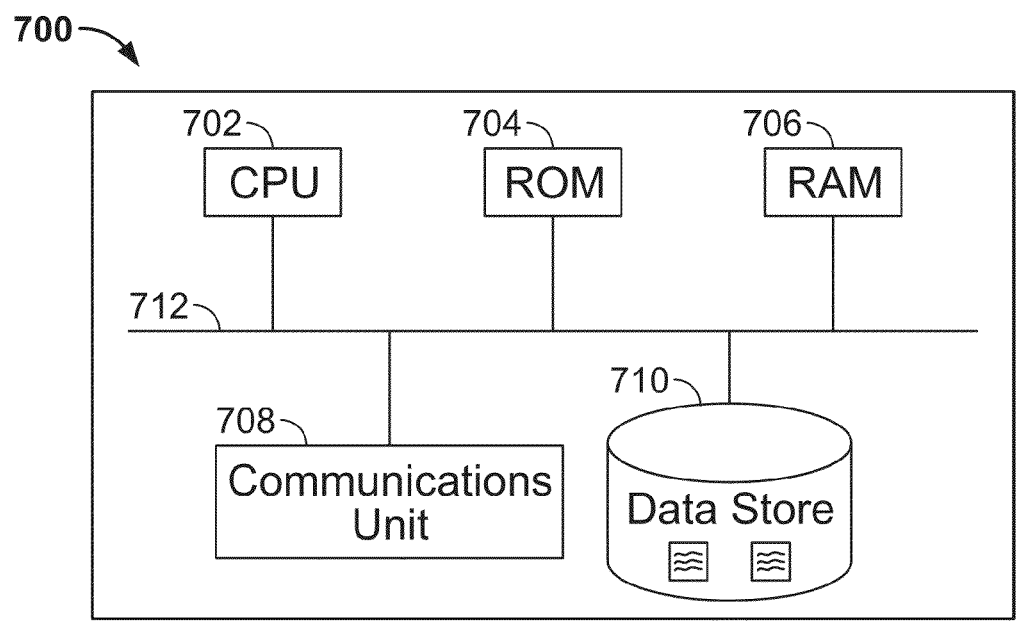
FIG. 7 shows the components of a server providing a cloud storage system capable of storing files and/or providing embeddable widgets in accordance with implementations as described herein.

Server 700 in FIG. 7 shows an example of a server for use in a cloud storage system and/or to provide embeddable UI as described herein. A cloud storage system may include a number of servers that collectively provide the cloud storage service and/or the embeddable widget service. Server 700 includes a central processing unit (CPU) 302, read only memory (ROM) 704, random access memory (RAM) 706, communications unit 708, data store 710, and bus 712. Server 700 may have additional components that are not illustrated in FIG. 7. Bus 712 allows the various components of server 700 to communicate with each other. Communications unit 708 allows the server 700 to communicate with other devices, such as client computers, other servers in the cloud storage system, or third-party systems. Data store 710 may store, among other things, data files belonging to users of the cloud storage system. Data store 710 may also store an embeddable UI software package that may be downloaded by third-party systems. Users connect with server 700 through communications unit 708 to access their files stored in data store 710. Server 700 also downloads copies of files directly from third-party systems through communications unit 708.

Data store 710 for providing cloud storage services may be implemented using non-transitory computer-readable media. In addition, other programs executing on server 700 may be stored on non-transitory computer-readable media. Examples of suitable non-transitory computer-readable media include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and readable, once-writable, or rewriteable CD-ROM and DVD-ROM disks.

Figure 8:
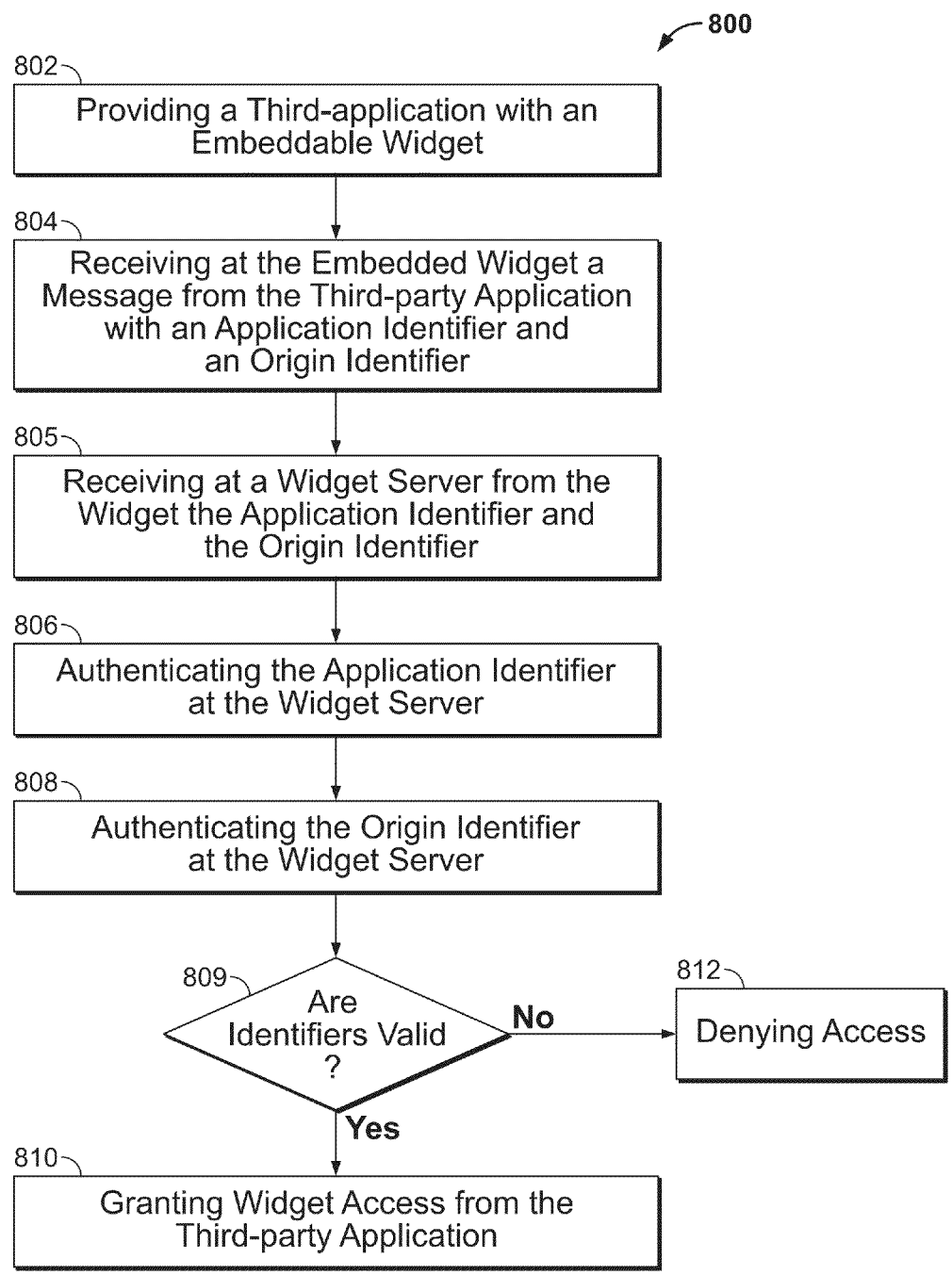
FIG. 8 is a flowchart of a method for providing a third-party system with an embeddable first-party user interface, in accordance with an implementation as described herein.

Methods for embedding a widget provided by a first party in a third-party system are now described. In some embodiments, the first party is a cloud storage system and the third-party system is an Internet service or application through which a user may want to access or manage objects stored on the cloud storage system. FIG. 8 is a flowchart of a method for providing a third-party system with an embeddable first-party user interface widget. Method 800 may be performed on a network system that includes a client computing device, one or more servers for providing cloud storage services and/or widget services, and one or more third-party systems. An example of a system on which the method may be performed is shown in FIG. 1.

At 802, a server that hosts a widget service (i.e., a first-party widget server) provides an embeddable user interface, or widget to a third-party system. The first-party widget server may be a standalone widget server, or it may be a component of another server that hosts a cloud storage service. The widget server may make available the embeddable UI for download by the third-party system. The third-party system incorporates the first-party embeddable UI or widget on one or more web pages controlled by the third-party system. The embeddable UI may be coded using Javascript or any other known web programming language. Examples of embeddable UIs that may be used by third-party systems are illustrated in FIGS. 2, 3 and 4.

When a user visits the third-party web page, the user's client computing device requests that a copy of the embeddable UI be loaded on the device (e.g., through a web browser). At 804, the embedded first-party widget receives a message from the embedding frame of the third-party application. The message may be a request including an application identifier and an origin identifier. The application identifier may be an integer, one or more characters, an alphanumeric representation, and/or any other suitable representation for identifying the embedding third-party application. An origin identifier may be a URL, one or more characters, an alphanumeric representation, and/or any other suitable representation for identifying the source of the embedding frame of the third-party application or site. The message may be implemented according to cross-frame communication protocols, such as HTML5 window.postMessage or any other form of message corresponding to a pre-established protocol.

At 805, a server controlled by the first party that hosts a widget service receives from the embedded widget the application identifier and the origin identifier. This may be communicated to the first-party widget server through any suitable protocol.

At 806, the widget server authenticates the application identifier. This step may involve determining whether the application identifier references a valid third-party application that has been previously installed or registered by the user.

At 808, the widget server authenticates the origin identifier. This step may involve determining whether the origin identifier is associated with the valid third-party application that is referenced by the authenticated application identifier from 806.

If the application and origin identifiers are determined to be valid at 809, then the widget is granted access from the third-party application at 810. For example, at 810, in response to the authenticating the application identifier and the origin identifier, the widget server may enable the first-party widget to access data in the cloud storage system from the embedding third-party application.

Alternatively, if the validation fails at 809, then at 812, the third-party application is denied access. In some embodiments, the first-party widget embedded in the third-party application is not displayed on the third-party web page in response to the authentication failing. In other embodiments, the first-party widget is displayed on the third-party web page, but the widget is denied access to the cloud storage system. These embodiments are illustrated in more detail in FIGS. 9 and 10 below.

Figure 9:
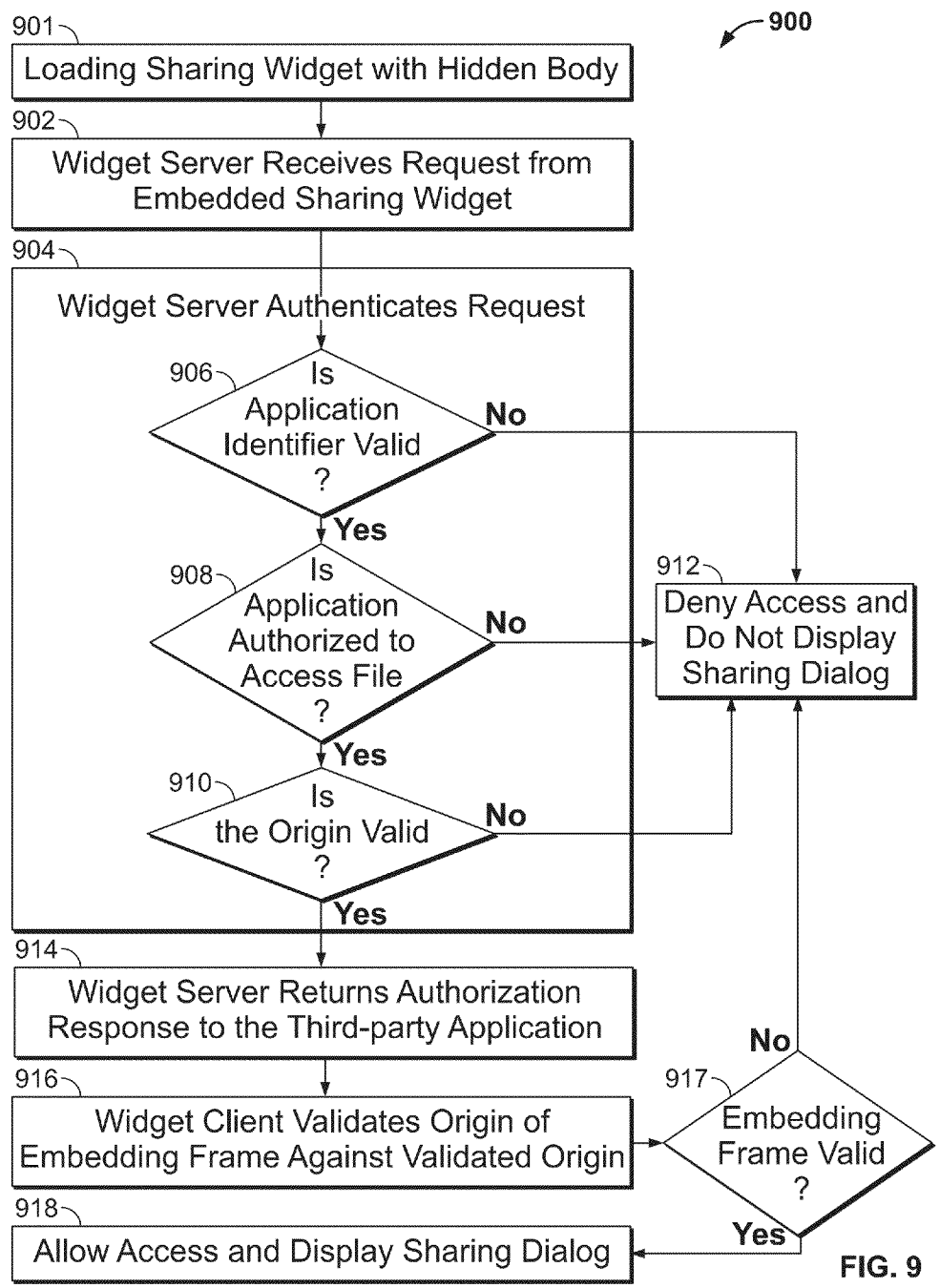
FIG. 9 is a flowchart of a method for providing a third-party system with an embeddable sharing widget, in accordance with an implementation as described herein.

FIG. 9 is a flowchart of a method 900 for embedding sharing widgets in third-party applications according to some embodiments. Method 900 may be performed on a network system that includes a client computing device, one or more servers for providing cloud storage services, and one or more third-party systems. An example of a system on which the method may be performed is shown in FIGS. 1 and 6.

At 901, a sharing interface is loaded within a third-party web site that is accessed on a client computing device. This widget may be similar to widget 210 of FIG. 2. The widget may initially be loaded with its visibility property set to hidden, e.g., using CSS embedded in the sharing frame 606 of FIG. 6. In some embodiments, a UI wrapper may be displayed with a container and/or background for the widget. The wrapper may have a border with elements such as a title, shadow, loading spinner, close button, and/or any suitable element but without user or application-specific data. The sharing widget contents, e.g., permission list, interactive buttons, etc. may not be shown until both server-side and client-side authorization checks have passed.

At 902, a widget server receives a request from a sharing client corresponding to the sharing widget embedded in the third-party site. The request may include various query parameters, such as an origin parameter called requestedEmbedOrigin. The requestedEmbedOrigin parameter may be the origin URL of the embedding third-party application. For example, if the URL of the embedding third-party website is "https://www.xyz.com/edit/doc/docId," the origin URL may be set to "https://www.xyz.com." The requestedEmbedOrigin parameter may be formatted according to known protocols that are well tested from a security standpoint. For example, requestedEmbedOrigin parameter may be formatted according to RFC 6454, which is a standard for browsers to enforce a same-origin policy. Other standards may be used as well without departing from the scope of this disclosure.

The request may also include an application identifier parameter. This parameter may be any suitable identifier of the embedding third-party application. Both the requestedEmbedOrigin and the application identifier parameters are passed by the third-party application and therefore may be set to any value, including values other than the legitimate origin and application identifier of the embedding application, respectively.

In some embodiments, the request may additionally include a resourceIDs parameter, which may be a set of identifiers of one or more objects such as files, documents, or other items stored on the cloud storage system, that a user may want to share from the third-party application.

At 904, the widget server verifies that the request from the third-party application is valid. This may include any number of authentication checks, such as steps 906, 908, and 910.

At 906, the widget server authenticates the application identifier parameter. This may be done by checking an authentication database, such as ThirdPartyAppDatabase 650 of FIG. 6. For example, the widget server may verify that the application identifier references an application that was previously installed or registered by the current user. In one implementation, the widget server invokes a function called getInstalledAppByApplicationIdentifier on the application identifier to verify that the application identifier refers to a valid application that is installed by the current user. If the user has installed the referenced application, then the application identifier is deemed valid.

At 908, each resource identifier in the resourceIDs list is used to look up the associated resource or item in the cloud storage system. For each resource, the widget server verifies that the third-party application is authorized to access the specific items referenced by the resourceIDs. For example, the widget server may check that the resource's authorized application list includes the application referenced by the application identifier. Alternatively, the widget server may verify that the resource has an associated type that is specific to the third-party application and matches the application identifier. In this latter case, because the third-party application stores and manages the items rather than the first-party cloud storage system, the specific third-party application that manages the data is implicitly authorized to access that data. Other checks may be implemented to verify that third-party application is authorized to access the items referenced in resourceIDs.

At 910, the widget server processes and verifiers the origin parameter, e.g., by verifying that the origin belongs to a list of authorized origins for the third-party application. The authorized origin list may be generated based on one or more URLs of the third-party application, a canonicalization of the origin according to known standards, or any other suitable operation. In some implementations, the origin parameter is verified through a separate API that manages registration of third-party applications with the cloud storage system.

If verification fails at any of steps 906, 908, or 910, then the widget server returns an error message such as an AccessDeniedException and aborts the request at 912. In this case, the widget is not displayed as its visibility property remains set to hidden.

If each of verification steps 906, 908 and 910 succeeds, then the widget server returns a third-party authorization response at 914. In some implementations, this may be a short acknowledgment message, confirming that the third-party request is valid. In some implementations, this may be in the form of a template parameter, called allowedOrigin. The template parameter allowedOrigin may be passed back to the sharing widget client embedded in a third-party site as an initial configuration parameter in a configuration map, or in any other suitable way. Additionally, the widget server may set some properties of the widget to allow embedding the widget in response to the successful authentication. In some implementations, this is done by setting one or more properties of the widget to allow displaying the sharing interface (e.g., by not including any X-Frame-Options header so that the frame is embeddable without restriction).

In some implementations, none of the checks in 904 establishes that the application identifier or the requestedEmbedOrigin parameters actually match the actual origin or application identifier of the embedding application. Such checks may be performed later at 916 by the sharing widget frame. In this way, the authentication checks in 904 only establish that the application identifier is valid, that the third-party application referenced by the application identifier is allowed to access the items referenced by resourceIDs, and that requestedEmbedOrigin is valid for the third-party application that is referenced by the application identifier. The determination of whether or not the embedding frame actually corresponds to the validated application identifier and origin may be left for the widget frame to make.

At 916, the widget frame validates the origin of the embedding frame against the origin validated by the widget server at 910. The validated origin may be retrieved by the widget frame from the authorization response returned to the third-party application at 914. For example, the third-party application may send a message (e.g., a postMessage) to the widget frame requesting to show/enable the widget contents. The widget frame may validate that the origin of the message matches the origin that the third-party application sent to the server at 902. The widget frame may then enable the widget contents if and only if the origins match. The authorization process is thus performed both in the widget frame (at 916)

and on the server (at 904). For example, the server validates that the parameters (e.g., resource identifier, origin, application identifier) are authorized, but it doesn't check whether the third party has provided the correct origin. The widget frame validates that the third-party-provided origin is in fact correct.

If the origin of the embedding frame does not match the origin parameter validated at 917, then access is denied and the sharing interface is not displayed, at 912. In response to this denial, the widget contents may never be made visible and an error message is displayed. The error message may be displayed where the widget contents would have been displayed.

Alternatively, if the origin of the embedding frame matches the origin parameter validated at 917, then at 918, the visibility property of the sharing interface is updated to show the sharing interface and the third-party application is given access to the files referenced in resourceIDs on the cloud storage system. For example, the sharing interface body may be initially hidden by default and is showed in response to receiving the allowedOrigin template parameter and checking that the allowedOrigin template parameter matches the origin of the embedding third-party frame and that third-party application referenced by the authenticated application identifier matches the embedding third-party application. Such checks may prevent third-party websites from displaying the sharing interface unless the embedded widget frame has validated that the origin of the embedding frame matches the returned allowedOrigin template parameter.

Displaying widgets only after authentication, as described in method 900, may significantly increase security and reduce the possibility of clickjacking. For example, method 900 ensures that the first-party widget is only embeddable in registered third-party applications that are installed by the current user. This mechanism prevents "drive-by" types of attacks because it checks that the user has previously chosen to provide at least a minimal degree of trust to the third-party application by installing it. The security of this process may be enhanced by requiring third-party applications to pay a registration fee in order to receive an application identifier, thereby increasing attack complexity because the attacker may need to use stolen credentials to register or may need to risk the attack being traced. Other mechanisms to increase security include blacklisting third-party applications from which malicious requests are received. Combined with requiring a registration fee, this blacklisting mechanism makes it significantly more difficult for attackers to continue operating malicious applications. Finally, method 900 ensures that the embeddable widgets may only be used with files that the third-party application already has access to. Because such an installed and properly authorized third-party application has the ability to download the file and access the file's data, a clickjacking attack to access the file has very limited benefit.

Figure 10:
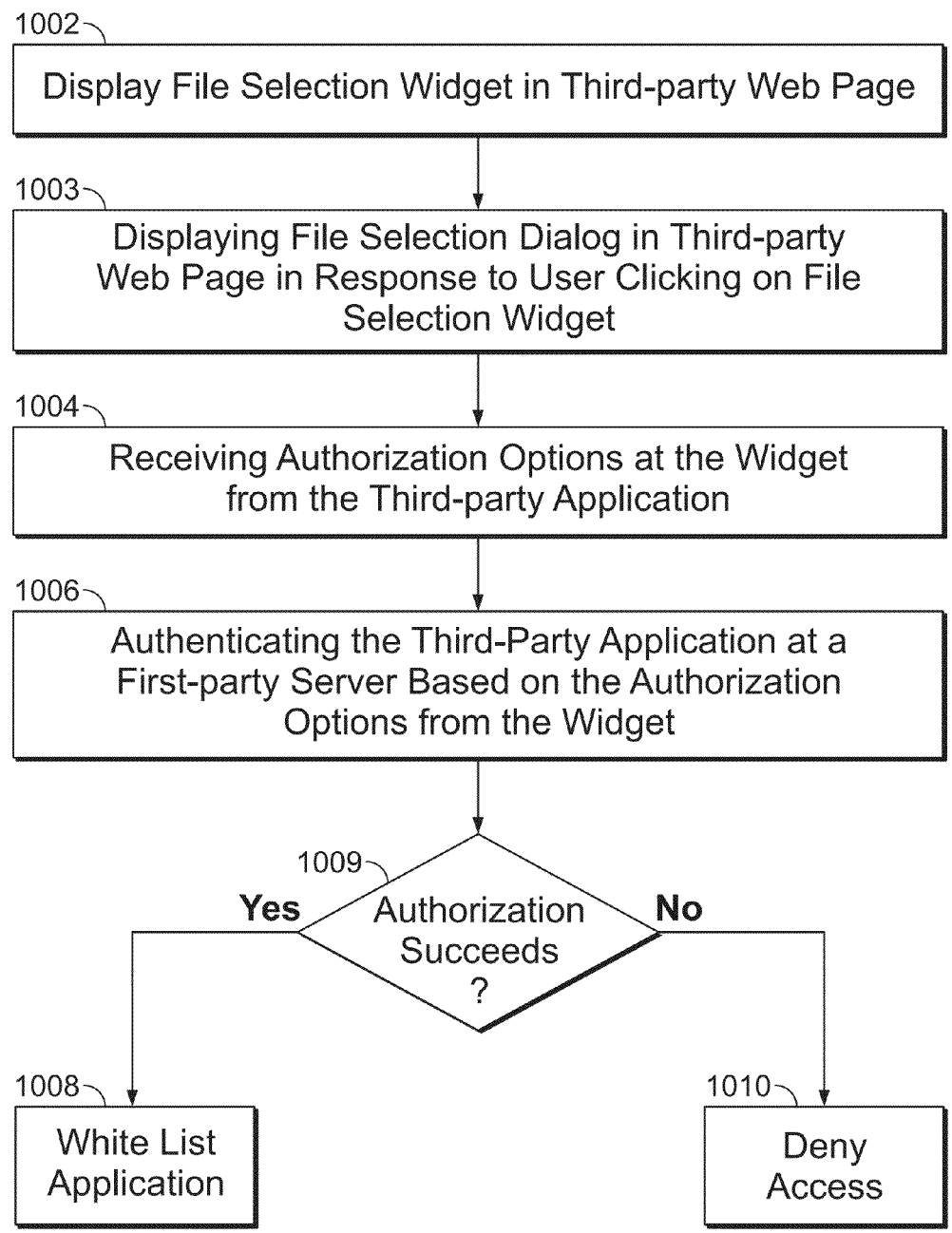
FIG. 10 is a flowchart of a method for providing a third-party system with an embeddable file selection widget, in accordance with an implementation as described herein.

FIG. 10 is a flowchart of a method for providing a third-party system with an embeddable first-party user interface widget that is a file selection widget. An example of a system on which the method may be performed is shown in FIGS. 1 and 6.

At 1002, a file selection widget is loaded within a third-party web site that is accessed on a client computing device. This widget may be similar to widget 208 of FIG. 2.

At 1003, a file selection interface, similar to the one in FIG. 4, is loaded within the third-party web site in response to the user clicking on the embedded widget from 1002.

At 1004, the third-party application provides authorization options to the embedded widget client. The authorization options may include an application identifier and origin identifier, similar to the identifiers discussed above. The security of this step may be enhanced by having the third-party application provide the authorization options via a window.postMessage( ) so that the origin identifier is automatically set based on the source of the postMessage, rather than the third-party application setting the origin itself. This makes it difficult for an attacker to fake the origin identifier, since the origin is not set by the sender of the message, but rather by the browser, so that the source is the actual origin of the message.

After the widget client receives the authorization options from the third-party application, the widget client calls into a first-party widget server to authenticate the third-party application in which the widget is embedded. In some implementations, this widget client calls a preOpen command provided by the widget server. The widget client may supply file identifiers and authorization options to the widget server.

At 1006, the first-part widget server may authenticate the third-party application based on the authorization options received from the widget client. For example, the widget server may validate, based on the information received from the widget client, that the user has appropriate access, that the specified third-party application is installed for the user, that the specified origin matches the origin of the embedding web frame, and/or any other suitable authentication check. In some implementations, the widget server checks that the application identifier exists in an authentication database such as ThirdPartyAppDatabase 650 of FIG. 6, that the user has installed the application identifier referenced by the application identifier, and that the origin sent from the widget client to the widget server is a valid origin for that application. For example, the widget server may save the URL from which a user first registers or installs an application, so that the widget server can extract the origin from that URL and compare it with the origin supplied from the widget client.

If the authentication succeeds at 1009, then at 1008, the third-application is whitelisted for use with the identifiers of the files that are selected through the file section interface. This may be done by linking the specified application identifier to each of the specified files in the authentication database. The files are then accessed from the third-party application.

If the authentication fails at 1009, then at 1010, the third-party application is not given authorization to access the cloud storage system. In the case of an attack, this means that an attacker may open the file section interface but does not have the ability to access any data in the cloud storage system from the opened file selection interface.

Methods 900 and 1000 allow embedding of a first-party widget in a third-party application based on checking the origin, e.g., URL, of the embedding third-party application website and checking that the user has installed the third-party application. One difference between methods 900 and 1000 is that the sharing interface in method 900 implements a file identifier check, as described in step 908, whereas method 1000 does not. Another difference is that the sharing interface in method 900 performs its authentication before the frame is visible to the user whereas the file selection interface in method 1000 is already visible to the user before the third-party checking is performed. This is because the authentication in method 1000 happens in response to a user attempting to open a file through the file selection interface. These differences may depend on the particular functionality of the widget, the anticipated security risks, and performance considerations. For example, checking prior to displaying the sharing widget increases the security of embedding the sharing interface against clickjacking but requires additional processing in the widget server.

One advantage of the systems and methods described herein is to allow third-party developers to easily embed first-party widgets giving users access to rich functionalities that are factored out of the third-party application development. For example, sharing, search, and/or drag-and-drop functionalities may be easily embedded in a third-party web site by simply including the first-party widget, without the third-party developer having to program such elaborate functionalities on the third-party site.

Another advantage of the systems and methods described herein is to enable secure deployment of common-looking widgets across different applications, so that a user who is familiar with how a common-looking widget looks like and behaves in one application, knows how the common-looking widget behaves in another application. Providing such common-looking widgets, e.g., a sharing widget or a file selection widget, across third-party applications enhances the user experience.

Another advantage of the disclosed systems and methods is the ability to securely embed widgets in third-party applications across multiple browsers, applications, web page origins, and client computing devices. Previous systems can set an HTTP header, called X-Frame Options of a frame to specify whether the frame can be embedded or not, but such embedding is an all-or-nothing solution that either denies a frame from being embedded anywhere (DENY value) or allows the frame to be embedded in another frame with the same origin (SAMEORIGIN value). Because SAMEORIGN only allows embedding if the frame origin is the same as the embedding page's origin, this is generally not useful for embedding first-party widgets in third-party applications that do not share the same origin. This all-or-nothing X-Frame-Options solution is thus not suitable for widgets embeddable in third-party pages because it either allows open access (insecure) or denies all access (impractical). X-Frame Options therefore offer an inflexible mechanism that depends on browser implementation and comes with several limitations that may prevent the header from offering protection in some instances. In contrast, the disclosed systems and methods allow flexibility and interoperability of third-party embedding and can provide the embedding in a way that is supported by multiple, different browsers.

Although the above systems and methods describe authenticating widget embedding in a third-party application based on prior user installation/registration of the third-party application and origin validation of the third-party application, various other criteria may be used to securely embed and use widgets from third-party applications. The permission mechanisms for embedding widgets in, and using the widgets from, a third-party web page may include any suitable authentication criterion, such as a type of the third-party application, checking the third-party application against a list of blacklisted applications, a type or setting of a user account, and/or any suitable way of restricting the third-party web site on which a particular widget can be embedded. The mechanisms described herein thus allow a first-party widget to choose to either be enabled or disabled based on whether or not the particular widget is embedded on a web page that meets the specified set of authentication criteria.

It will be apparent that aspects of the systems and methods described herein may be implemented in many different forms of software, firmware, and hardware in the implementations illustrated in the figures. The actual software code or specialized control hardware used to implement aspects consistent with the principles of the systems and method described herein is not limiting. Thus, the operation and behavior of the aspects of the systems and methods were described without reference to the specific software code—it being understood that one of ordinary skill in the art would be able to design software and control hardware to implement the aspects based on the description herein.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

What is claimed is:

1. A method for embedding a widget provided by a first-party system in a third-party application, the method comprising:
   providing the third-party application with an embeddable first-party widget for embedding in a third-party web page, wherein the third-party web page is controlled by the third-party application;
   receiving a message at the embedded first-party widget from the embedding third-party application, wherein the message comprises an application identifier and an origin identifier;
   receiving at a first-party server from the embedded first-party widget the application identifier and the origin identifier;
   authenticating the application identifier at the first-party server, wherein said authenticating the application identifier comprises determining whether the application identifier references a valid third-party application;
   authenticating the origin identifier at the first-party server, wherein said authenticating the origin identifier comprises determining whether the origin identifier is associated with the valid third-party application that is referenced by the authenticated application identifier; and
   in response to said authenticating the application identifier and the origin identifier, enabling the first-party widget to access the first-party system from the embedding third-party application.

2. The method of claim 1, wherein:
   the first-party server communicates with a cloud storage system;
   the message received at the embedded first-party widget from the embedding third-party application further comprises a document identifier; and
   the determining whether the application identifier references the valid third-party application comprises:
      determining that the application identifier references a third-party application that was previously installed by a user; and
      determining that the application identifier references a third-party application that was previously authorized by the user to access a document referenced by the document identifier, wherein the document is stored on the cloud storage system.

3. The method of claim 1, wherein the authenticating the application identifier and the origin identifier are performed before rendering visible at least a portion of the first-party widget in the third-party web page, the method further comprising:
   in response to the authenticating the application identifier and the origin identifier, rendering visible the at least the portion of the first-party widget.

4. The method of claim 1, wherein the authenticating the application identifier and the origin identifier are performed after rendering visible a wrapper of the first-party widget in the third-party web page, wherein in response to determining at least one of the application identifier not referencing the valid third-party application and the origin identifier not being associated with the valid third-party application, denying the first-party widget access to the first-party server from the embedding third-party application.

5. The method of claim 1, further comprising:
including a widget client in the third-party web page;
wrapping the widget client in an application programming interface (API), wherein the API exposes at least one functionality of the widget to the third-party application; and
sending the message with the application identifier and the origin identifier from the wrapped widget client to the embedded widget.

6. The method of claim 5, further comprising checking, at the widget, that the origin identifier associated with the valid third-party application matches an origin of the embedding third-party web page.

7. The method of claim 5, wherein the message received at the embedded first-party widget from the widget client is generated using a web browser, wherein the browser automatically sets the origin identifier based on an address of the third-party web page.

8. The method of claim 1, wherein the embeddable widget comprises one of a sharing interface, a document selection user interface, a file manager user interface, a document editing user interface, a third-party application installation interface, and a toolbar.

9. A system for embedding a widget provided by a first-party system in a third-party application, the system comprising:
a first-party server device configured for:
providing the third-party application with an embeddable first-party widget for embedding in a third-party web page, wherein the third-party web page is controlled by the third-party application, wherein the embedded first-party widget is configured for receiving a message from the embedding third-party application, and wherein the message comprises an application identifier and an origin identifier;
receiving at the first-party server from the embedded first-party widget the application identifier and the origin identifier;
authenticating the application identifier at the first-party server, wherein said authenticating the application identifier comprises determining whether the application identifier references a valid third-party application;
authenticating the origin identifier at the first-party server, wherein said authenticating the origin identifier comprises determining whether the origin identifier is associated with the valid third-party application that is referenced by the authenticated application identifier; and
in response to said authenticating the application identifier and the origin identifier, enabling the first-party widget to access the first-party system from the embedding third-party application.

10. The system of claim 9, wherein:
the first-party server communicates with a cloud storage system;
the message received at the embedded first-party widget from the embedding third-party application further comprises a document identifier; and
the first-party server is configured for:
determining that the application identifier references a third-party application that was previously installed by a user; and
determining that the application identifier references a third-party application that was previously authorized by the user to access a document referenced by the document identifier, wherein the document is stored on the cloud storage system.

11. The system of claim 9, wherein the first-party server is configured for authenticating the application identifier and the origin identifier before rendering visible at least a portion of the first-party widget in the third-party web page, wherein:
in response to the first-party server authenticating the application identifier and the origin identifier, rendering visible the at least the portion of the first-party widget.

12. The system of claim 9, wherein the first-party server is configured for authenticating the application identifier and the origin identifier after rendering visible a wrapper of the first-party widget in the third-party web page, wherein in response to the first-party server determining at least one of the application identifier not referencing the valid third-party application and the origin identifier not being associated with the valid third-party application, the first-party server is configured for denying the first-party widget access to the first-party server from the embedding third-party application.

13. The system of claim 9, wherein:
a widget client is included in the third-party web page;
the widget client is wrapped in an application programming interface (API), wherein the API exposes at least one functionality of the widget to the third-party application; and
the wrapped widget sends the message with the application identifier and the origin identifier to the embedded widget.

14. The system of claim 13, wherein the first-party server is configured for checking, at the widget, that the origin identifier associated with the valid third-party application matches an origin of the embedding third-party web page.

15. The system of claim 13, wherein the message received at the embedded first-party widget from the widget client is generated using a web browser, wherein the browser automatically sets the origin identifier based on an address of the third-party web page.

16. A non-transitory computer readable medium storing computer executable instructions, which, when executed by a processor circuitry, causes the circuitry to carry out a method for embedding a widget provided by a first-party system in a third-party application, the method comprising:
providing the third-party application with an embeddable first-party widget for embedding in a third-party web page, wherein the third-party web page is controlled by the third-party application;
receiving a message at the embedded first-party widget from the embedding third-party application, wherein the message comprises an application identifier and an origin identifier;
receiving at a first-party server from the embedded first-party widget the application identifier and the origin identifier;
authenticating the application identifier at the first-party server, wherein said authenticating the application identifier comprises determining whether the application identifier references a valid third-party application;
authenticating the origin identifier at the first-party server, wherein said authenticating the origin identifier comprises determining whether the origin identifier is associated with the valid third-party application that is referenced by the authenticated application identifier; and in response to said authenticating the application identifier and the origin identifier, enabling the first-party widget to access the first-party system from the embedding third-party application.

17. The non-transitory computer readable medium of claim 16, wherein:
the first-party server communicates with a cloud storage system;
the message received at the embedded first-party widget from the embedding third-party application further comprises a document identifier; and
the determining whether the application identifier references the valid third-party application comprises:
determining that the application identifier references a third-party application that was previously installed by a user; and
determining that the application identifier references a third-party application that was previously authorized by the user to access a document referenced by the document identifier, wherein the document is stored on the cloud storage system.

18. The non-transitory computer readable medium of claim 16, wherein the authenticating the application identifier and the origin identifier are performed before rendering visible at least a portion of the first-party widget in the third-party web page, and wherein:
in response to the authenticating the application identifier and the origin identifier, rendering visible the at least the portion of the first-party widget.

19. The non-transitory computer readable medium of claim 16, wherein the authenticating the application identifier and the origin identifier are performed after rendering visible a wrapper of the first-party widget in the third-party web page, wherein in response to determining at least one of the application identifier not referencing the valid third-party application and the origin identifier not being associated with the valid third-party application, denying the first-party widget access to the first-party server from the embedding third-party application.

20. The non-transitory computer readable medium of claim 16, wherein the embeddable widget comprises one of a sharing interface, a document selection user interface, a file manager user interface, a document editing user interface, a third-party application installation interface, and a toolbar.

* * * * *